(No Model.) T. J. REID. 2 Sheets—Sheet 1.
BALL BEARING.

No. 546,558. Patented Sept. 17, 1895.

Witnesses: Inventor.
Jos H Blackwood Thomas J. Reid
H P Doolittle. by Wm H Doolittle
Attorney.

(No Model.) 2 Sheets—Sheet 2.
T. J. REID.
BALL BEARING.
No. 546,558. Patented Sept. 17, 1895.
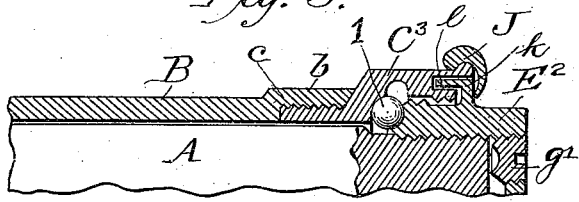
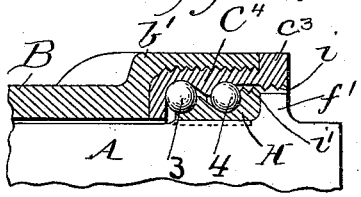
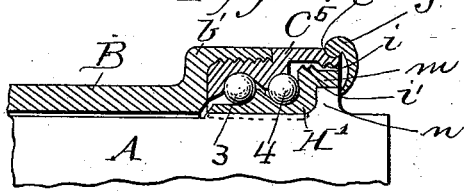
Witnesses: Inventor.
Jas H Blackwood Thomas J. Reid
H. P. Doolittle. by Wm H Doolittle
Attorney.

United States Patent Office.

THOMAS J. REID, OF WASHINGTON COURT-HOUSE, ASSIGNOR OF ONE-HALF TO J. LYMAN DANN, OF COLUMBUS, OHIO.

BALL-BEARING.

SPECIFICATION forming part of Letters Patent No. 546,558, dated September 17, 1895.

Application filed February 8, 1895. Serial No. 537,725. (No model.)

*To all whom it may concern:*

Be it known that I, THOMAS J. REID, a citizen of the United States, residing at Washington Court-House, in the county of Fayette and State of Ohio, have invented certain new and useful Improvements in Ball-Bearings; and I do hereby declare the following to be a full, clear, and exact description of the invention, such as will enable others skilled in the art to which it appertains to make and use the same.

My invention relates to ball-bearings for vehicle and other journals, and its objects are to provide bearings composed of few and strong pieces, to secure an easy and convenient adjustment of the balls, and to provide means whereby the dust and dirt are effectually excluded from the bearings, while at the same time the lubricating material is prevented from escaping. In many forms of ball-bearings now in use either no means at all are provided for insuring the exclusion of dirt from the bearings, or it is found necessary to employ separate parts, distinct from the bearings proper, consisting of bushings, plugs, or rings, in the attempt to retain the lubricant in place and keep out the dirt. These additional pieces tend to lessen the strength of the bearings, increase the cost of manufacture, render the construction and adjustment more complex, and in some cases tend to "bind" the bearings.

My invention is designed to obviate these and other difficulties, and to this end it consists of the parts and combinations of parts hereinafter described, and set forth in the claims.

The device is illustrated in the accompanying drawings, in which—

Figure 1:
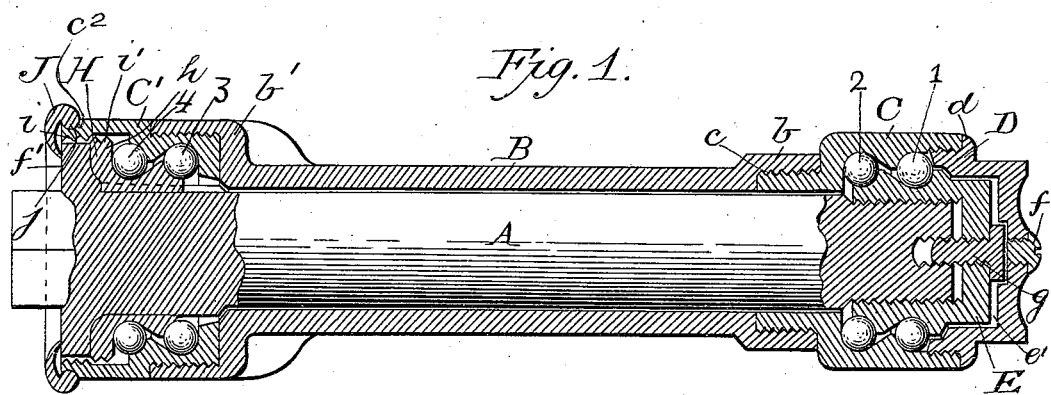
Figure 2:
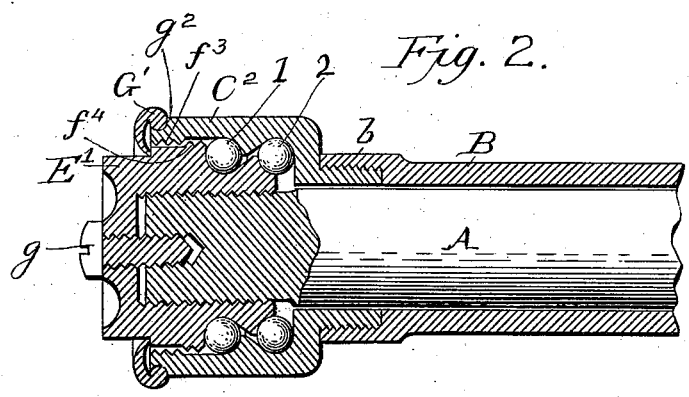

Figure 1 is a longitudinal sectional view of a journal-box, journal, and bearings; Fig. 2, a similar view of a modification of the outer end of Fig. 1; Fig. 3, a like view of a modification of the same parts, and Figs. 4 and 5 sectional views showing modified constructions of the inner end of Fig. 1.

Referring to the drawings, A is the journal part of an axle inclosed by the journal-box B. In the drawings the journal is shown tapering; but my invention can be used with straight journals also, as well as with shafting in hubs of loose pulleys and other journals. The axle-box B is enlarged at its outer end, forming a flange $b$, which is threaded interiorly to receive an exteriorly-threaded flange $c$ of a case C. The case C is also provided with screw-threads near its outer end upon its interior surface. A cap D is threaded on the exterior of its inner end and screws into the case C and is provided with a shoulder $d$, abutting against said case. E is a threaded sleeve or nut adapted to be screwed onto the threaded end of the axle. This axle-nut is provided with a screw $g$, which passes into a threaded hole in the axle to lock the nut in place. Just outside the screw $g$ in the cap $d$ is a screw-plug $f$, closing the oil-hole through which when the plug is removed oil may be admitted to the oil-channel $e'$. The balls 1 and 2 have their bearings in case C and axle-nut E, raceways for the balls to run in being formed in and by said parts. It will thus be seen that the incasement for the balls at the outer end is composed of three pieces—the case C, the axle-cap D, and the adjusting axle-nut E. At the inner or butt end of the axle-journal the box is enlarged at $b'$ in the same manner as at the point or outer end, and is likewise threaded interiorly to receive a case C' threaded exteriorly, the outer edge of which is flush with the outer edge of the axle-collar $f'$. Abutting against this collar is a cone-bearing H, with raceways formed therein for the balls 3 and 4 to run in. This cone H is made to slide on the axle and has a rib or feather on its interior surface which slides in a groove in the axle. The case C' has opposite corresponding grooves to complete the ball-races.

On the inner surface of the case C', just above the axle-collar, so as to clear the same, are cut screw-threads $i$, for the purpose hereinafter described. Cone H is provided with like threads $i'$ on the edge of the flange $h$. The threads $i$ and $i'$ are both either right-hand or left-hand threads, according to which side of the vehicle they are on. The cone H is screwed into the case C', and when the threads are disengaged they overlap each other, and the cone H is caged with the balls within case C', thus forming an independent ball-incasement that goes on and off with the wheel and can be detached from the box without displacing the balls or disconnecting the incasement. When the wheel is in motion, these threads $i$ and $i'$ act on the principle of an endless screw-conveyer, the threads $i$ constantly ejecting the dirt and dust which may have entered the box and the threads $i'$, retaining the oil within the incasement and box.

J is a rubber cap bearing with a light tension on the axle-collar and on the case C'. The case C' is provided with an annular groove $c^2$ to receive the rounded part $j$ of this cap. The cap J serves as an additional guard against the entrance of dust and dirt into the box and also serves to keep out the water when the vehicle is being washed.

Fig. 2 is a modification in which the axle-cap D of Fig. 1 is dispensed with and in which the same arrangement of conveyer-threads as appears in the butt construction of Fig. 1 is shown.

The case $C^2$ is provided with screw-threads $f^3$ near its outer end and on its inner surface. The nut E' has like threads $f^4$, adapted to screw into and pass beyond the threads $f^3$. A rubber cap G' is sprung into the annular groove $g^2$ in the case $C^2$, the inner edge of said cap bearing on the face of the nut E'. The nut is provided with the usual locking-screw, by removing which oil is admitted to the bearings. In this modification a groove may be cut longitudinally through the screw-threads on the axle in order to form an oil-channel, or an oil-hole may be provided in the case $C^2$ to admit the oil to the injecting-threads. The case $C^2$ is shown in Fig. 2 of the drawings in its preferable form with screw-threads cut in the flange that fits under the box to engage the part $b$ of the box; but this flange may be unthreaded, the nut E' being sufficient to retain the case within the box. In such a construction means to prevent the case from turning, such as a rib or feather thereon, would have to be employed.

It will be seen that in Fig. 2, by dispensing with the axle-cap D, only two pieces at either end are used to incase the balls and form complete bearings.

Fig. 3 is a modified construction of the outer end of my device, showing the use of but one row of balls at each end of the axle. The nut $E^2$ has a lateral flange $k$, from which an inwardly-projecting flange $l$ extends into a groove in the case $C^3$. A screw $g'$, corresponding to screws $g$ of the previous figures, occupies an eccentric position in the nut $E^2$. Its point is concave and bears against the end of the journal. The same means for the admission of oil to the balls may be provided, as described, for the construction shown in Fig. 2.

In Fig. 4 a slightly different construction from that of the butt or inner end of Fig. 1 is shown. The case $C^4$ extends under the box B for a greater length and is provided with a narrow outward flange $c^3$, which abuts against the end of the box and locks the case firmly in the same.

Fig. 5 shows another modification of the butt of Fig. 1. In this case the cone H' is provided with a flange $m$, which fits loosely over the axle-collar $n$. The case $C^5$ and cone H' are provided with conveyer-threads. This modified construction is intended especially for use in connection with the axles of buggies and other vehicles now commonly employed, wherein the axle-collar of standard gage is of smaller diameter than the axle-collars shown in the other figures of the drawings, so that if a standard axle-collar is used in connection with the axle-box shown in the drawings there will be a space between the collar and the threads on the case $C^5$. The flange $m$ fills up this space between the collar and case and helps to prevent the entrance of dust, dirt, &c.

The incasements for the balls in all the forms shown are independent. They may be removed from both the wheel and axle without removing or displacing the balls in their bearings.

The manner of adjusting the balls is the same with all the constructions shown. The balls at both ends of the axle-journal are adjusted simultaneously by screwing up the nut E, which forms a cone-bearing for the balls at the outer end. This nut or cone adjusts the balls at the point, and these in turn bear on the case and carry the wheel back on the axle, causing the ring-bearings in case C' to move on the balls at the inner end and set the cone H in proper position.

With all the constructions in which four lines of balls are shown it will be readily seen that two or three lines of balls can be used without departing from the principle of my invention.

Having thus described my invention, what I claim is—

1. The combination with the journal, of the axle box enlarged at its outer end, a case having a flange extending under said enlarged end, an internally threaded nut screwing on and inclosing the threaded end of said journal, means passing through said nut for locking it to the journal, said case and nut provided with raceways for balls, and said balls, substantially as described.

2. The combination with the journal of the axle box enlarged and threaded interiorly at its outer end, a case having a threaded flange extending under and engaging said enlarged end, said case threaded internally at its outer end, a cap having a threaded flange extending under and engaging said case, an internally threaded nut on the threaded end of said journal and partially inclosed by said cap, said case and nut provided with raceways for balls, and said balls, substantially as described.

3. The combination with the journal, of the axle box threaded interiorly at its inner end, a case having at one end an externally threaded flange screwing under the end of said box, said case provided with internal screw threads at its other end, a cone on said journal abutting the axle collar, said cone having a flange provided with screw threads upon its surface, said case and cone provided with raceways for balls, and said balls, substantially as described.

4. In combination with the journal, the axle box, a case having raceways for balls, a journal cone provided with corresponding raceways, balls in said raceways, said case having conveyer threads upon its inner surface whereby when the wheel is in motion said threads prevent dirt from entering the box, substantially as described.

5. In combination with the journal, the axle box, a case having raceways for balls, a journal cone provided with corresponding raceways, balls in said raceways, said cone having conveyer threads upon its outer surface, whereby when the wheel is in motion said threads retain the oil within the box, substantially as described.

6. In combination with the journal and the axle box enlarged at its outer end, a complete and independent incasement for the balls composed of a case having a flange extending under said enlarged end and an internally threaded nut on the threaded end of said journal, said case and nut provided with conveyer threads, said case and nut provided with raceways for balls, and said balls, substantially as described.

7. In a ball bearing axle, the combination with the journal collar and the case, said case provided with an exterior annular groove, of an external elastic cap having an annular rounded portion adapted to be sprung into said groove, said cap near its inner edge bearing with a slight tension upon said journal collar, substantially as described.

In testimony whereof I affix my signature in presence of two witnesses.

THOMAS J. REID.

Witnesses:
FRANK A. CHAFFIN,
STANLEY B. VAN DEMAN.